US010498386B2

United States Patent
Gävert et al.

(10) Patent No.: US 10,498,386 B2
(45) Date of Patent: Dec. 3, 2019

(54) INTERFERENCE SUPPRESSION IN A RADIO TRANSCEIVER DEVICE (71) Applicant: Telefonaktiebolaget LM Ericsson (publ), Stockholm (SE)

(72) Inventors: Björn Gävert, Göteborg (SE); Mats Rydström, Billdal (SE); Göran Nilsson, Hisings Backa (SE); Thomas Eriksson, Göteborg (SE); Robert Lindgren, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/083,234

(22) PCT Filed: Feb. 14, 2017

(86) PCT No.: PCT/EP2017/053325
§ 371 (c)(1),
(2) Date: Sep. 7, 2018

(87) PCT Pub. No.: WO2017/174240
PCT Pub. Date: Oct. 12, 2017

(65) Prior Publication Data
US 2019/0089403 A1 Mar. 21, 2019

(30) Foreign Application Priority Data
Apr. 5, 2016 (WO) .................. PCT/EP2016/057404

(51) Int. Cl.
*H04B 1/525* (2015.01)
*H04B 1/10* (2006.01)
(Continued)

(52) U.S. Cl.
CPC ............ *H04B 1/525* (2013.01); *H04B 1/0475* (2013.01); *H04B 1/10* (2013.01); *H04L 1/206* (2013.01);
(Continued)

(58) Field of Classification Search
CPC ....... H04B 1/1027; H04B 1/525; H04L 27/26; H04L 1/206; H04L 1/248; H04L 5/0048; H04W 84/12; H04W 72/0453
See application file for complete search history.

(56) References Cited

U.S. PATENT DOCUMENTS

| 5,218,448 A | * | 6/1993 | Honjo | .................... H03D 3/002 386/202 |
| 5,848,105 A | | 12/1998 | Gardner et al. | |

(Continued)

FOREIGN PATENT DOCUMENTS

WO 2017174116 A1 10/2017

OTHER PUBLICATIONS

Kay, Steven M., et al., "Fundamentals of Statistical Signal Processing: Estimation Theory," Prentice Hall Signal Processing Series, vol. 1, Prentice Hall PTR, Upper Saddle River, NJ, 1993, 595 pages.
(Continued)

*Primary Examiner* — Janice N Tieu
(74) *Attorney, Agent, or Firm* — Withrow & Terranova, PLLC (57) ABSTRACT

There is provided mechanisms performed by a control device for suppressing interference in a received reception signal in a radio transceiver device. The radio transceiver device is configured to receive the reception signal as a radio reception signal and to generate a radio transmission signal. The radio transmission signal and the radio reception signal occupy at least partly non-overlapping frequency bands. A method comprises obtaining a transmission reference signal (Continued)

based on the radio transmission signal. The method comprises estimating an interference distortion component signal based on the transmission reference signal and on a model of nonlinearity in a radio circuit of the radio transceiver device. The method comprises suppressing interference in the reception signal by combining the reception signal with the distortion component signal.

16 Claims, 7 Drawing Sheets

(51) Int. Cl.
    *H04L 1/20*         (2006.01)
    *H04L 1/24*         (2006.01)
    *H04L 5/00*         (2006.01)
    *H04B 1/04*         (2006.01)
    *H04W 72/04*      (2009.01)

(52) U.S. Cl.
    CPC ............ *H04L 1/248* (2013.01); *H04L 5/0048* (2013.01); *H04W 72/0453* (2013.01)

(56) References Cited

U.S. PATENT DOCUMENTS

| | | | | |
|---|---|---|---|---|
| 7,916,671 B1* | 3/2011 | Zortea | ............. | H04L 27/362 |
| | | | | 370/286 |
| 9,209,891 B1* | 12/2015 | Mandell | ............. | H04B 7/1851 |
| 2003/0160896 A1* | 8/2003 | Ho Kim | ............. | H04N 5/211 |
| | | | | 348/470 |
| 2007/0184782 A1 | 8/2007 | Sahota et al. | | |
| 2007/0254590 A1* | 11/2007 | Lopez | ............. | H04B 1/1036 |
| | | | | 455/63.1 |
| 2010/0277236 A1* | 11/2010 | Horiguchi | ............. | H03F 1/30 |
| | | | | 330/149 |
| 2011/0195672 A1 | 8/2011 | Pratt et al. | | |
| 2014/0126675 A1* | 5/2014 | Monsen | ............. | H04B 1/10 |
| | | | | 375/350 |
| 2014/0194071 A1 | 7/2014 | Wyville | | |
| 2014/0194073 A1 | 7/2014 | Wyville et al. | | |
| 2015/0180685 A1 | 6/2015 | Noest et al. | | |
| 2017/0104506 A1* | 4/2017 | Liu | ............. | H04B 1/1027 |
| 2017/0207812 A1 | 7/2017 | Wyville | | |

OTHER PUBLICATIONS

International Search Report and Written Opinion for International Patent Application No. PCT/EP2016/057404, dated Nov. 30, 2016, 9 pages.

International Search Report and Written Opinion for International Patent Application No. PCT/EP2017/053325, dated Apr. 18, 2017, 11 pages.

Non-Final Office Action for U.S. Appl. No. 16/083,176, dated Feb. 19, 2019, 17 pages.

\* cited by examiner

INTERFERENCE SUPPRESSION IN A RADIO TRANSCEIVER DEVICE

This application is a 35 U.S.C. § 371 national phase filing of International Application No. PCT/EP2017/053325, filed Feb. 14, 2017, which claims the benefit of International Application No. PCT/EP2016/057404, filed Apr. 5, 2016, the disclosures of which are incorporated herein by reference in their entireties.

TECHNICAL FIELD

Embodiments presented herein relate to interference suppression, and particularly to a method, a control device, a computer program, and a computer program product for suppressing interference in a received reception signal in a radio transceiver device.

BACKGROUND

In communications networks, there may be a challenge to obtain good performance and capacity for a given communications protocol, its parameters and the physical environment in which the communications network is deployed.

For example, radio link systems in some communications networks are designed as Frequency Division Duplex (FDD) systems. In FDD systems the transmitted carrier frequency differs from the received carrier frequency. The transmitted signal is commonly at a much higher power level than the received signal. Hence, the receiver of a radio transceiver device operating in a FDD system would saturate if the transmitted signal of the radio transceiver device would leak into its receiver.

A diplexer filter (also known as a branching filter) is commonly used to prevent the transmitted signal from leaking with high power into the receiver. Such a diplexer is relatively expensive to manufacture, and constitutes a quite space-consuming component. Furthermore, FDD systems used for providing microwave links are manufactured and sold for many different frequency bands, and it is therefore necessary to have at least one specific diplexer per frequency band, due to the frequency dependency of components. Hence, the diplexer is commonly designed in several variants (many per frequency band) leading to high cost due to the diplexer as such and the variant penalty cost. There is thus a need for a less complicated mechanism for preventing the transmitted signal of the radio transceiver device to leak into its receiver.

SUMMARY

An object of embodiments herein is to provide efficient mechanisms for suppressing interference in a received reception signal in a radio transceiver device.

According to a first aspect there is presented a method performed by a control device for suppressing interference in a received reception signal in a radio transceiver device. The radio transceiver device is configured to receive the reception signal as a radio reception signal and to generate a radio transmission signal. The radio transmission signal and the radio reception signal occupy at least partly non-overlapping frequency bands. The method comprises obtaining a transmission reference signal based on the radio transmission signal. The method comprises estimating an interference distortion component signal based on the transmission reference signal and on a model of nonlinearity in a radio circuit of the radio transceiver device. The method comprises suppressing interference in the reception signal by combining the reception signal with the distortion component signal.

Advantageously this method provides efficient suppression of interference in a received reception signal in a radio transceiver device. In particular, interference arising from cross-modulation between transmitted and received signals, due to the non-linearity in the radio circuit, is suppressed.

Advantageously this method provides a simple mechanism for preventing, or at least countering/alleviating, leakage of the transmitted signal of the radio transceiver device into its receiver.

Advantageously this method reduces the total cost of the radio transceiver device.

Advantageously this method requires only a few frequency indexes to be stored in the radio transceiver device which, in turn, gives low production cost and less warehousing comparted to a radio transceiver device using a diplexer.

Advantageously this method requires less variants of the radio transceiver device which, in turn, gives low production cost and less warehousing of the radio transceiver device computed to a radio transceiver device using a diplexer.

According to a second aspect there is presented a control device for suppressing interference in a received reception signal in a radio transceiver device. The radio transceiver device is configured to receive the reception signal as a radio reception signal and to generate a radio transmission signal. The radio transmission signal and the radio reception signal occupy at least partly non-overlapping frequency bands. The control device comprises processing circuitry. The processing circuitry is configured to cause the control device to obtain a transmission reference signal based on the radio transmission signal. The processing circuitry is configured to cause the control device to estimate an interference distortion component signal based on the transmission reference signal and on a model of nonlinearity in a radio circuit of the radio transceiver device. The processing circuitry is configured to cause the control device to suppress interference in the reception signal by combining the reception signal with the distortion component signal.

According to a third aspect there is presented a control device for suppressing interference in a received reception signal in a radio transceiver device. The radio transceiver device is configured to receive the reception signal as a radio reception signal and to generate a radio transmission signal. The radio transmission signal and the radio reception signal occupy at least partly non-overlapping frequency bands. The control device comprises processing circuitry and a computer program product. The computer program product stores instructions that, when executed by the processing circuitry, causes the control device to perform steps, or operations. The steps, or operations, cause the control device to obtain a transmission reference signal based on the radio transmission signal. The steps, or operations, cause the control device to estimate an interference distortion component signal based on the transmission reference signal and on a model of nonlinearity in a radio circuit of the radio transceiver device. The steps, or operations, cause the control device to suppress interference in the reception signal by combining the reception signal with the distortion component signal.

According to a fourth aspect there is presented a control device for suppressing interference in a received reception signal in a radio transceiver device. The radio transceiver device is configured to receive the reception signal as a radio reception signal and to generate a radio transmission signal.

The radio transmission signal and the radio reception signal occupy at least partly non-overlapping frequency bands. The control device comprises an obtain module configured to obtain a transmission reference signal based on the radio transmission signal. The control device comprises an estimate module configured to estimate an interference distortion component signal based on the transmission reference signal and on a model of nonlinearity in a radio circuit of the radio transceiver device. The control device comprises a suppress module configured to suppress interference in the reception signal by combining the reception signal with the distortion component signal.

According to a fifth aspect there is presented a computer program for suppressing interference in a received reception signal in a radio transceiver device, the computer program comprising computer program code which, when run on a control device, causes the control device to perform a method according to the first aspect.

According to a sixth aspect there is presented a computer program product comprising a computer program according to the fifth aspect and a computer readable storage medium on which the computer program is stored.

According to a seventh aspect there is presented a radio transceiver device too configured to receive the reception signal as a radio reception signal and to generate a radio transmission signal. The radio transmission signal and the radio reception signal occupy at least partly non-overlapping frequency bands. The radio transceiver device comprises a control device for suppressing interference in a received reception signal in the radio transceiver device according to any of the second aspect, the third aspect, or the fourth aspect.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, a diplexer filter is commonly used to prevent signals transmitted by a radio transceiver device from leaking into the receiver of the radio transceiver device. Disadvantages of such a diplexer have also been noted above.

The herein disclosed embodiments provide mechanisms that reduce cross modulation effects when the diplexer is replaced by a component that have lower isolation between transmitter and receiver, for example, by a notch filter.

Replacing the diplexer with a notch filter still leads to some power reduction of the transmitted signal into the receiver. However, the transmitted signal power suppression using a notch filter is lower compared to what is achieved using a diplexer. In general terms, the transmitted signal leaking into the receiver will experience nonlinear distortion in elements like the Low Noise Amplifier (LNA). A side effect of this is cross modulation nonlinear distortion, i.e. that the transmitted signal mixes with the received signal in the nonlinear elements in the receiver of the radio transceiver device. This way, components of the transmitted signal are translated in frequency and end up in the receive band of a FDD based communication system. Such components can then not be suppressed by simple filtering, since such filtering would also suppress the received desired signal. This is a problem which, if left unaddressed, will lead to performance degradation of the communication system.

The embodiments disclosed herein in particular relate to mechanisms for suppressing interference in a received reception signal in a radio transceiver device. In order to obtain such mechanisms there is provided a control device, a method performed by the control device, a computer program product comprising code, for example in the form of a computer program, that when run on a control device, causes the control device to perform the method.

Figure 1:
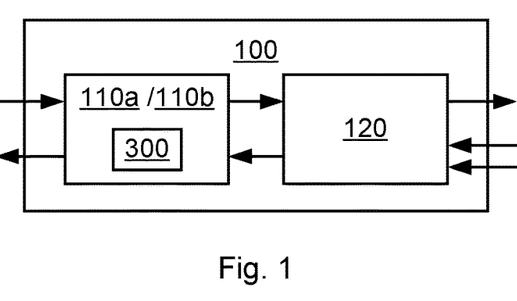
FIGS. 1, 2, 3 are schematic diagrams illustrating radio transceiver devices and parts thereof according to embodiments.

FIG. 1 is a schematic diagram illustrating a radio transceiver device 100 according to an embodiment. The radio transceiver device 100 comprises a baseband part 110 and a radio frequency part 120. The baseband part 110 comprises baseband circuitry and is configured for processing of transmission signals and reception signals at baseband, or potentially at an intermediate frequency. The radio frequency part 120 comprises radio circuitry and is configured for processing of transmission signals and reception signals at radio frequency. The baseband part 110 comprises a control device 300. A description of the functionality of the control device 300 will be provided below with reference to FIGS. 9 and 10.

According to aspects of the disclosed radio transceiver device 100 for use in a microwave radio link, radio frequency is often in the order to several tens of GHz, intermediate frequency is in the MHz range, while baseband is a frequency band comprising and often centred around zero frequency.

Figure 2:
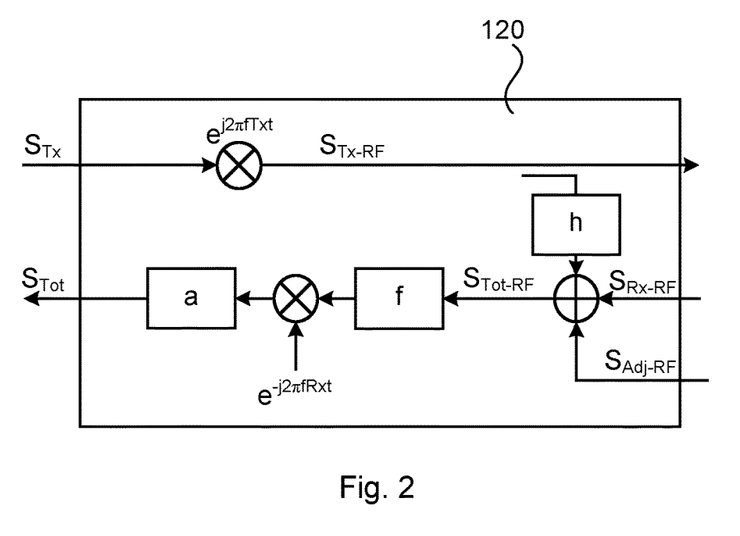

FIG. 2 is a schematic diagram illustrating details of the radio frequency part 120 of the radio transceiver device 100 according to an embodiment.

The radio frequency part 120 is configured to generate (by up converting a transmission signal $S_{Tx}$ by multiplication with $e^{j2\pi fTxt}$) and to transmit a radio transmission signal $S_{Tx\text{-}RF}$ to a remote transceiver and to receive a radio reception signal $S_{Tot\text{-}RF}$ from the remote transceiver.

The radio transmission signal $S_{Tx\text{-}RF}$ leaks into the radio reception signal $S_{Tot\text{-}RF}$, here modelled by h. According to an embodiment the model h is a linear model, e.g. a tapped delay-line model. The model $h(S_{Tx\text{-}RF})$ could be based on band-stop filtering of the radio transmission signal $S_{Tx\text{-}RF}$. In this way the leakage of the radio transmission signal $S_{Tx\text{-}RF}$ into the radio reception signal $S_{Tot\text{-}RF}$ could be modelled as being caused by at least one notch filter replacing the diplexer. For example, according to aspects h is a linear filter. The total received radio reception signal $S_{Tot\text{-}RF}$ is therefore the sum of a desired radio reception signal $S_{Rx\_RF}$ and a filtered version of the radio transmission signal $S_{Tx\text{-}RF}$. The reception signal $S_{Tot\text{-}RF}$ thus comprises the desired radio reception signal and an internal leakage contribution, as modelled by the model $h(S_{Tx\text{-}RF})$, of the radio transmission signal $S_{Tx\text{-}RF}$.

The total received signal may also comprise one or more adjacent interferer signals. Hence, according to an embodiment the reception signal $S_{Tot\text{-}RF}$ further comprises an external leakage contribution $S_{Adj\text{-}RF}$ of another radio reception signal. According to some aspects this so-called another radio reception signal defines an adjacent interferer signal. However, according to other aspects this so-called another radio reception signal could be any modulated signal. The desired radio reception signal $S_{Rx\text{-}RF}$ and this another radio reception signal can be located on neighbouring carrier frequencies, or be separated by at least one channel (where each channel could be defined by its own carrier frequency).

The relative difference in power between the transmitted signal and the desired reception signal, i.e., between $S_{Tx\text{-}RF}$ and $S_{Rx\text{-}RF}$ is often large, i.e. $P_{Tx\text{-}RF} \gg P_{Rx\text{-}RF}$ and $P_{Tx\text{-}RF} \gg P_{Adj\text{-}RF}$, where $P_{Tx\text{-}RF}$ denotes the power of $S_{Tx\text{-}RF}$, where $P_{Rx\text{-}RF}$ denotes the power of $S_{Rx\text{-}RF}$, and where $P_{Adj\text{-}RF}$ denotes the power of $S_{Adj\text{-}RF}$. According to an embodiment the radio transmission signal $S_{Tx\text{-}RF}$ is more than one order of magnitude larger in power than the desired radio reception signal $S_{Rx\text{-}RF}$ (or even the radio reception signal $S_{Tot\text{-}RF}$).

Figure 4:
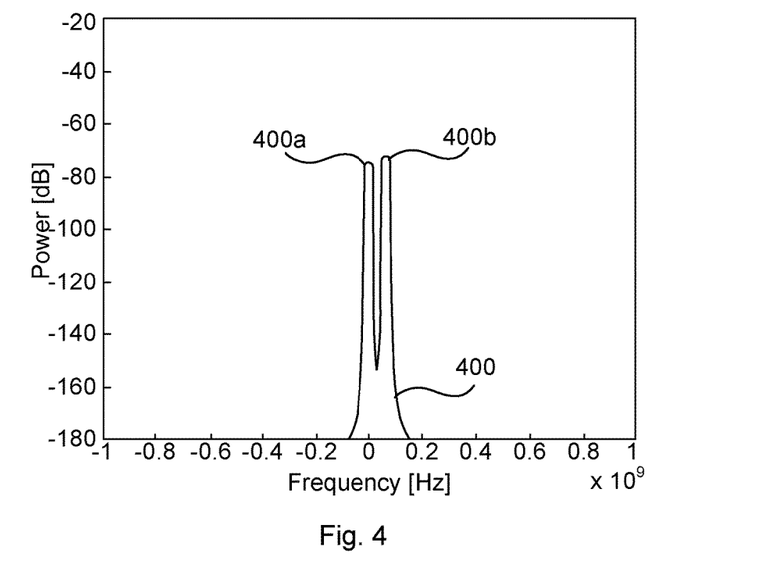
FIGS. 4, 5, 6, 7, and 8 schematically illustrate signal spectrums according to embodiments.
Figure 5:
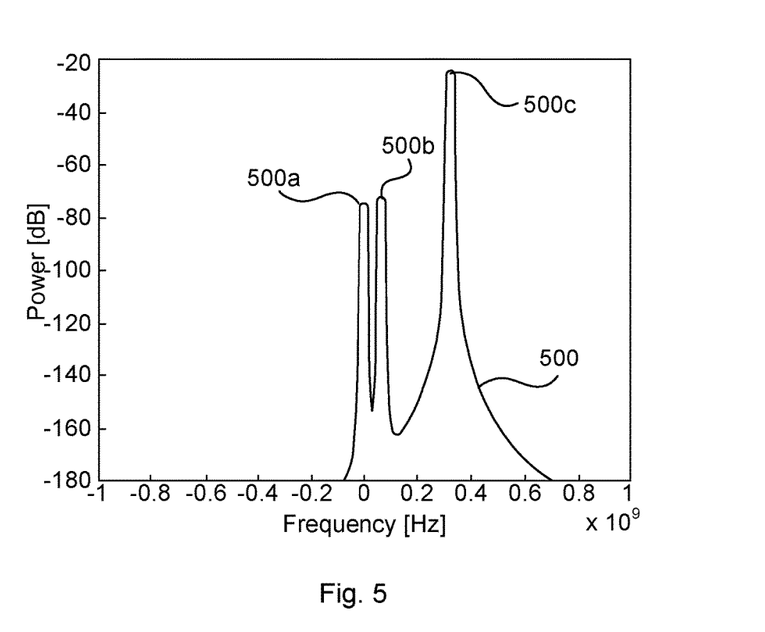

An example of a resulting signal spectrum 400 of the desired radio reception signal $S_{Rx\text{-}RF}$ and the external leakage contribution $S_{Adj\text{-}RF}$ of another radio reception signal is illustrated in FIG. 4. In FIG. 4 the left-most peak 400a is caused by $S_{Rx\text{-}RF}$ and the right-most peak 400b is caused by $S_{Adj\text{-}RF}$. As a comparison, an example of a resulting signal spectrum 500 of the total received radio reception signal $S_{Tot\text{-}RF}$ (i.e., also including the radio transmission signal $S_{Tx\text{-}RF}$) is illustrated in FIG. 5. In FIG. 5 the left-most peak 500a is caused by $S_{Rx\text{-}RF}$, the middle-most peak 500b is caused by $S_{Adj\text{-}RF}$, and the right-most peak 500c is caused by $S_{Tx\text{-}RF}$.

The total received radio reception signal $S_{Tot\text{-}RF}$ is distorted by a function denoted $f$, before down conversion (by multiplication with $e^{-j\pi fRxt}$). According to aspects the function $f$ is nonlinear and modelled as memoryless. For example, the nonlinear function $f$ can be modelled by a third order memoryless nonlinearity and hence be written as follows:

$$f(x;\ A) = x + Ax|x|^2. \tag{1}$$

In Equation (1), the symbol x denotes input to the nonlinear function (here defined by the total received radio reception signal $S_{Tot\text{-}RF}$), and A is a parameter of function $f$, i.e., A parameterizes $f$. It can be assumed that $|A| \ll 1$. In general terms, LNAs in a radio receiver are typically of class A type (i.e., so-called class A amplifiers). Normally a third order intermodulation is dominating over all other intermodulation products. The same is true for other non-linear elements like mixers. A more general form of memoryless non-linearity than expressed in Equation (1) is therefore:

$$f(x;\ A) = x + \sum_{n=1}^{N} A_n x|x|^n.$$

This general form is hereinafter approximated by Equation (1). Equation (1) is thus an approximation of the true distortion. Equations (2), (3), (4), (8), and (9) below are based on this approximation.

The resulting total received radio reception signal $f(S_{Tot\text{-}RF})$ after having been subjected to the nonlinearity $f$ is modelled as follows:

$$f(S_{Tot\text{-}RF};A) = h \otimes S_{Tx\text{-}RF} + S_{Rx\text{-}RF} + S_{Adj\text{-}RF} + A(h \otimes S_{Tx\text{-}RF} + S_{Rx\text{-}RF} + S_{Adj\text{-}RF})|h \otimes S_{Tx\text{-}RF} + S_{Rx\text{-}RF} + S_{Adj\text{-}RF}|^2 \tag{2}$$

In Equation (2) the symbol $\otimes$ denotes convolution. In Equation (2) any receiver noise has been assumed to be insignificant.

Figure 6:
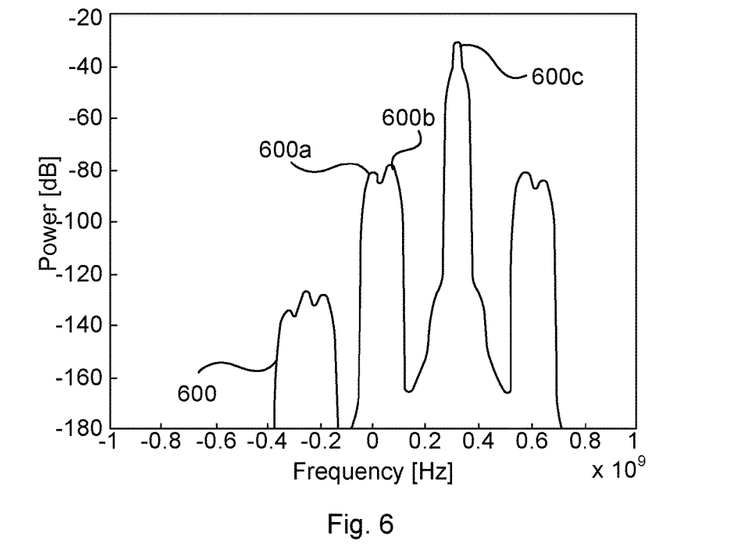

FIG. 6 schematically illustrates the resulting signal spectrum 600 where the non-linear function $f$ is set to $f(S_{Tot\text{-}RF};A)$ defined in Equation (2), and the filter h is determined as h=1. Peaks 600a and 600b are caused by $S_{Rx\text{-}RF}$ and $S_{Adj\text{-}RF}$, respectively, and peak 600c is caused by $S_{Tx\text{-}RF}$. All different signal spectrums contain distortion shown as side lobes to the original spectra. The distortion of $S_{Rx\text{-}RF}$ and $S_{Adj\text{-}RF}$ is due to the cross modulation from $S_{Tx\text{-}RF}$ (as seen in Equation (2) and (3)).

Figure 7:
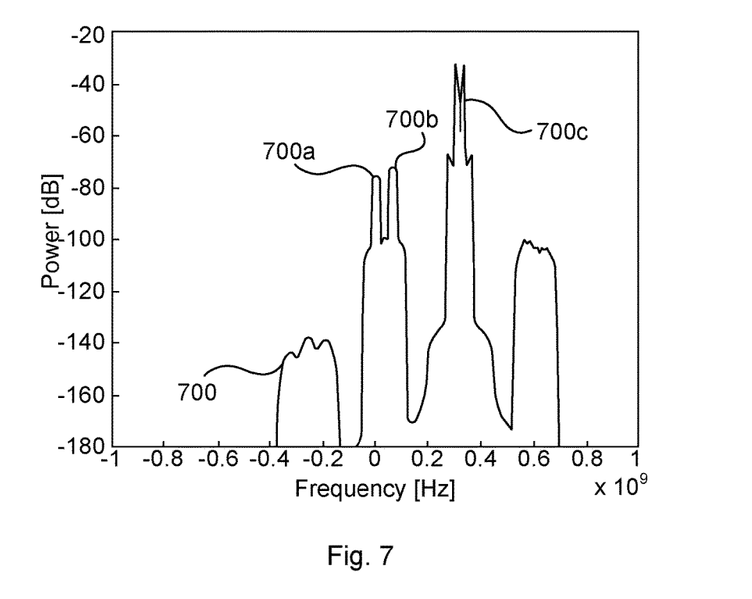

As a comparison FIG. 7 schematically illustrates the resulting signal spectrum 700 where a notch filter has been used as filter h. Peaks 700a and 700b are caused by $S_{Rx\text{-}RF}$ and $S_{Adj\text{-}RF}$, respectively, and peak 700c is caused by $S_{Tx\text{-}RF}$. The distortion of $S_{Rx\text{-}RF}$ and $S_{Adj\text{-}RF}$ is reduced significantly (side lobes are now reduced). However, the distortion due to cross modulation is still considered far too high to meet requirements on received signal quality.

Further, a linear filter $\alpha$, illustrated in FIG. 2, is configured to remove all signals not centered around $S_{Rx}$ (and $S_{Adj}$, where $S_{Adj}$ is a baseband version of $S_{Adj\text{-}RF}$) and thus to remove up and down converted versions of the radio transmission signal $S_{Tx\text{-}RF}$. Thus, after application of the linear filter $\alpha$ the radio transmission signal $S_{Tx\text{-}RF}$ and non-relevant signals are heavily suppressed and thus in principle removed. Thus all the peaks centered around $-0.3 \cdot 10^9$ Hz and $0.6 \cdot 10^9$ Hz together with the transmission signal close to $0.3 \cdot 10^9$ Hz in FIG. 7 can be removed by filtering. But note that the cross modulation of $S_{Tx\text{-}RF}$ and $S_{Adj\text{-}RF}$ still leaks into the desired reception signal $S_{Rx}$. The remaining reception signal $S_{Tot}$ can thus be expressed as follows:

$$S_{Tot} = S_{Rx} + 2AS_{Rx}|h \otimes S_{Tx\text{-}RF}|^2 + S_{Adj\text{-}RF} + 2AS_{Adj}|h \otimes S_{Tx\text{-}RF}|^2. \tag{3}$$

One general task and purpose of the receiver is to derive information in $S_{Rx}$, from the observed reception signal $S_{Tot}$, i.e. to remove unwanted distortion and the adjacent channel ($S_{Adj}$).

Figure 3:
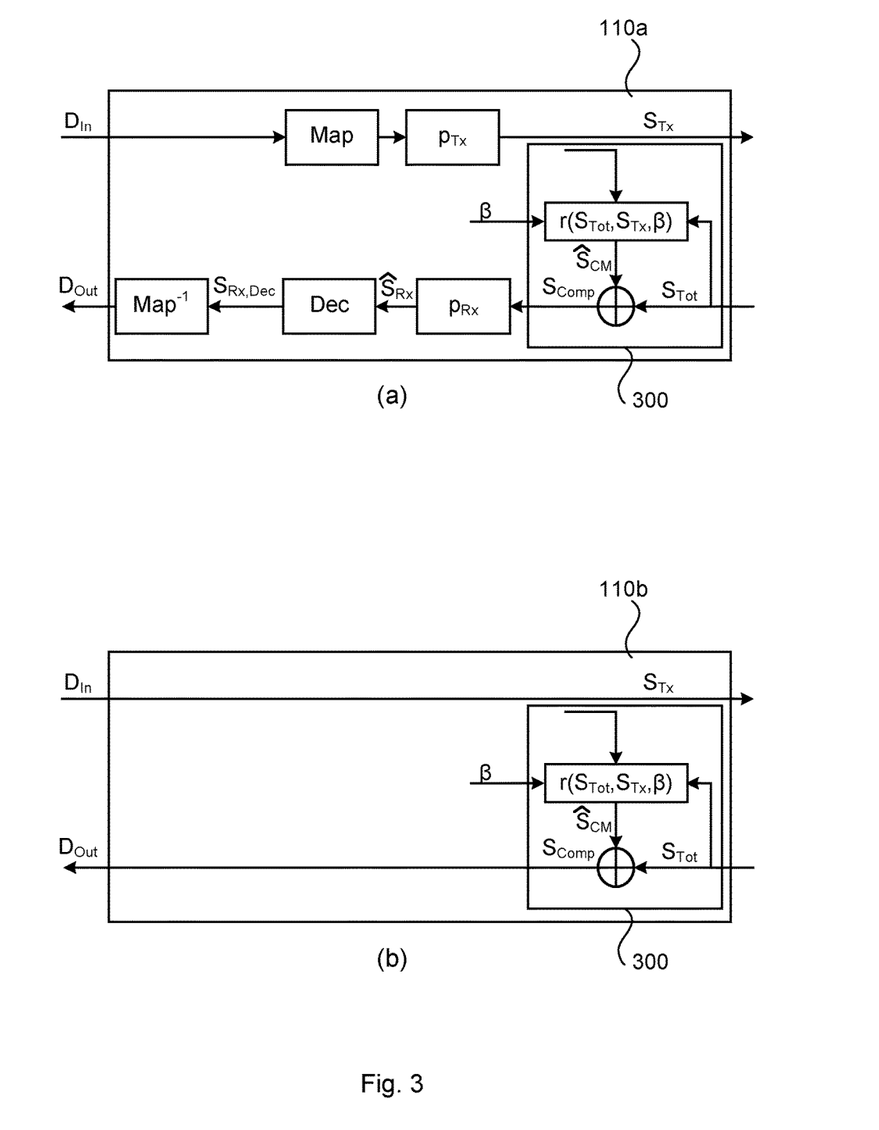

FIGS. 3(a) (b) are schematic diagrams illustrating details of the baseband part 110 of the radio transceiver device 100 according to embodiments.

The transmission signal $S_{Tx}$ is generated by a mapper (denoted Map in FIG. 3(a)) mapping symbols of a digital input signal $D_{in}$ to a signal constellation point and filtering the thus generated sequence of constellation points by a transmitter filter $p_{Tx}$. The transmission signal $S_{Tx}$ will below be denoted a transmission reference signal.

The reception signal $S_{Tot}$ is processed by a control device 300 to provide a compensated reception signal $S_{Comp}$. Further details of the control device 300 and how the compensated reception signal $S_{Comp}$ is determined will be disclosed below.

According to the embodiment in FIG. 3(a), the compensated reception signal $S_{Comp}$ is filtered by a receiver filter $p_{Rx}$, resulting in a filtered receiver signal $\hat{S}_{Rx}$, and fed to a detector, denoted Dec, resulting in a detected receiver signal $S_{Rx,Dec}$. The detector can be assumed a hard decision detector, i.e. it decides based on minimum Euclidean to a given set of symbols (for example an M-ary quadrature amplitude modulation (QAM) constellation). The detector could, according to some aspects, use prior knowledge (such as a training sequence or known symbols appearing periodically) as a complement to the hard decision. The detected receiver signal $S_{Rx,Dec}$ is then fed to an inverse mapper Map$^{-1}$ performing the inverse operations of the mapper Map to produce a digital output sequence $D_{Out}$.

According to the embodiment in FIG. 3(b), no further processing is performed on the compensated reception signal $S_{Comp}$ to produce a digital output sequence $D_{Out}$.

Figure 9:
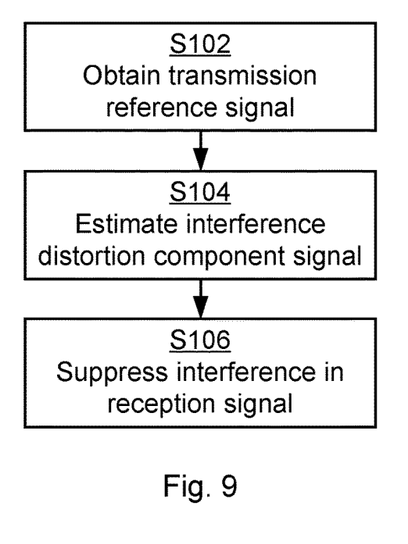
FIGS. 9 and 10 are flowcharts of methods according to embodiments.

Reference is now made to FIG. 9 illustrating a method for suppressing interference in a received reception signal $S_{Tot}$ in the radio transceiver device 100 as performed by the control device 300 according to an embodiment.

As disclosed above, the radio transceiver device 100 is configured to receive the reception signal $S_{Tot}$ as a radio reception signal $S_{Tot\_RF}$ and to generate a radio transmission signal $S_{Tx-RF}$. The radio transmission signal $S_{Tx-RF}$ and the radio reception signal $S_{Tot-RF}$ occupy at least partly non-overlapping frequency bands.

S102: The control device 300 obtains the transmission reference signal $S_{Tx}$ based on the radio transmission signal $S_{Tx-RF}$.

S104: The control device 300 estimates an interference distortion component signal $\hat{S}_{CM}$. The interference distortion component signal $\hat{S}_{CM}$ is estimated based on the transmission reference signal $S_{Tx}$ and on the model of nonlinearity in a radio circuit of the radio transceiver device 100. An example of this model h has been provided above.

S106: The control device 300 suppresses interference in the reception signal $S_{Tot}$. Interference in the reception signal $S_{Tot}$ is suppressed by combining the reception signal $S_{Tot}$ with the distortion component signal $\hat{S}_{CM}$.

In general terms, combining the reception signal $S_{Tot}$ with the distortion component signal $\hat{S}_{CM}$ results in a compensated reception signal $S_{Comp}$. According to an embodiment the compensated reception signal $S_{Comp}$ is determined so as to compensate the reception signal $S_{Tot}$ for the internal leakage contribution due to $h(S_{Tx-RF})$.

According to an embodiment the interference distortion component signal $\hat{S}_{CM}$ represents at least one non-linear component, for example the nonlinear function $f$, in the radio circuit of the radio transceiver device 100.

According to an embodiment the interference distortion component signal $\hat{S}_{CM}$ is an estimation of cross modulation in a receiver branch of the radio transceiver device 100.

Embodiments relating to further details of suppressing interference in a received reception signal $S_{Tot}$ in the radio transceiver device 100 will now be disclosed.

Figure 10:
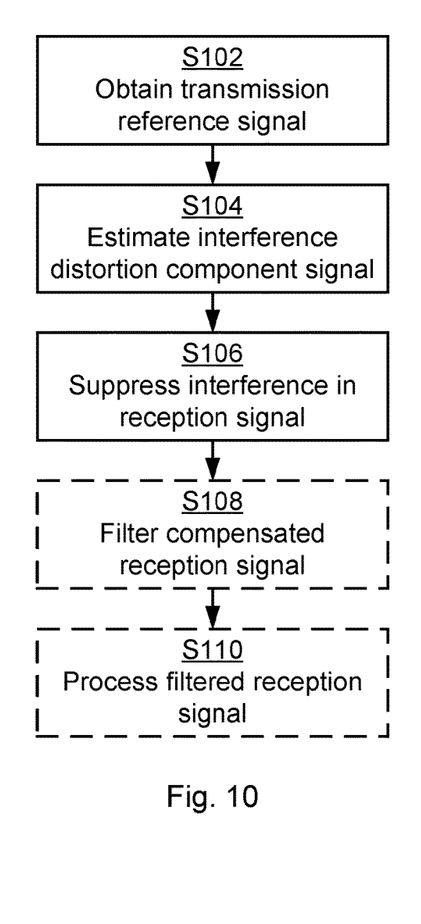

Reference is now made to FIG. 10 illustrating methods for suppressing interference in a received reception signal $S_{Tot}$ in the radio transceiver device 100 as performed by the control device 300 according to further embodiments. It is assumed that steps S102, S104, S106 are performed as described with reference to FIG. 9, and a repeated description of these steps is therefore omitted.

One general task and purpose of the receiver is to derive information in $S_{Rx}$ from the observed reception signal $S_{Tot}$, i.e. to remove unwanted distortion and the adjacent channel ($S_{Adj-RF}$). The cross modulation of $S_{Tx-RF}$ and $S_{Adj-RF}$ leaks into the desired reception signal $S_{Rx}$. Without any cross modulation $S_{Adj-RF}$ could be removed by filtering. Without any cross modulation $S_{Tx-RF}$ could also be removed by filtering.

Instead the control device 300 is configured to estimate the cross modulation $S_{CM}$, i.e. to find $\hat{S}_{CM}$. From Equation (3) follows that the cross modulation $S_{CM}$ can be defined according to Equation (4):

$$S_{CM} = 2As_{Rx}|h \otimes S_{Tx-RF}|^2 + 2As_{Adj}|h \otimes S_{Tx-RF}|^2 \quad (4)$$

The radio transmission signal $S_{Tx-RF}$ can be assumed known or at least the complex base band version of it, i.e. the transmission signal $S_{Tx}$, can be considered known. Thus, according to aspects, one task of the control device 300 is to find a function, $r(S_{Tot}, S_{Tx}, \beta)$, where $\beta$ denotes a parameter (which may be vector valued), that estimates $\hat{S}_{CM}$ such that $$\hat{S}_{CM} = r(S_{Tot}, S_{Tx}, \beta). \quad (5)$$

The control device 300 could thereby estimate the cross modulation $S_{CM}$ using the estimator, r, and compensates the received signal $S_{Tot}$ with the estimated distortion $\hat{S}_{CM}$. According to an embodiment the interference distortion component signal $\hat{S}_{CM}$ is estimated by minimizing an error signal e based on a difference between the compensated reception signal $S_{Comp}$ and a receiver signal. As disclosed above, $\hat{S}_{Rx}$ is a filtered receiver signal and $S_{Rx,Dec}$ is a detected receiver signal. Hence, according to an embodiment the control device 300 is configured to determine the filtered receiver signal $\hat{S}_{Rx}$ by performing step S108 and to process the filtered receiver signal $\hat{S}_{Rx}$ to obtain the detected receiver signal $S_{Rx,Dec}$ by performing step S110:

S108: The control device 300 filters the compensated reception signal $S_{Comp}$, resulting in the filtered receiver signal $\hat{S}_{Rx}$.

S110: The control device 300 processes the filtered receiver signal $\hat{S}_{Rx}$ by the detector, resulting in the detected receiver signal $S_{Rx,Dec}$.

The error signal e is then determined as a difference between the filtered receiver signal $\hat{S}_{Rx}$ and the detected receiver signal $S_{Rx,Dec}$. That is, according to an embodiment the error signal e is formulated as in Equation (6):

$$e = \hat{S}_{Rx} - S_{Rx,Dec}. \quad (6)$$

There can be different ways to use the error signal e to determine the interference distortion component signal $\hat{S}_{CM}$. According to an embodiment the interference distortion component signal $\hat{S}_{CM}$ is estimated using a least means squares (LMS) estimate based on the error signal e. According to another embodiment the interference distortion component signal S is estimated using a recursive least squares (RLS) estimate based on the error signal e. In further detail, the square of the error signal e can be minimized in order to determine an optimum parameter set β for estimating $\hat{S}_{CM}$.

An LMS approach finding the parameters can be derived according to Equation (7):

$$E[e\,(n)e(n)^*]=E[e(n)(S_{CM}(n)-r(S_{Tot},S_{Tx},\beta))^*]. \quad (7)$$

The intention is to minimize the square of this error signal finding the optimum parameter set β for estimating $\hat{S}_{CM}$. Thus to minimize the cost function in Equation (8):

$$J(n)=E[e\,(n)e(n)^*] \quad (8)$$

The resulting compensation then becomes according to Equation (9):

$$\hat{S}_{CM}(n)=S_{Tot}(n)\left(\sum_{k=0}^{N}\sum_{l=0}^{N}\beta_{k,l}S_{Tx}(n-k)S_{Tx}(n-l)^*\right). \quad (9)$$

The LMS expression estimating the coefficients $\beta_{k,l}$ becomes:

$$\beta_{k,l}(m+1)=\beta_{k,l}(m)-\mu e(n)S_{Tot}(n)^*S_{Tx}(n-k)^*S_{Tx}(n-l). \quad (10)$$

Figure 8:
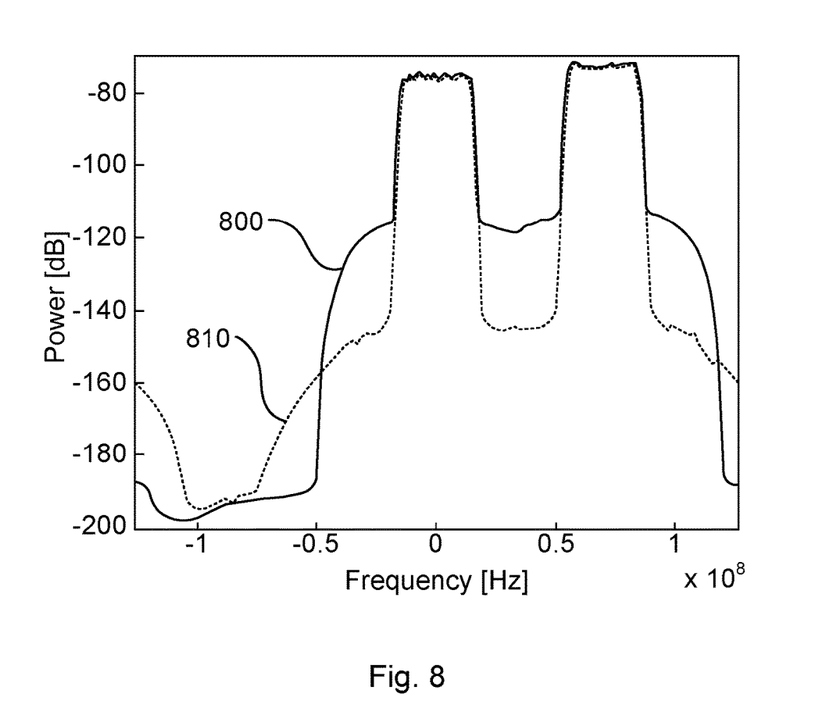

In Equation (10) the symbol * denotes complex conjugation. Using a filter h with h=1 and appropriate configuration of A, the down converted compensated spectrum 810 and uncompensated spectrum 800 as illustrated in FIG. 8 are achieved, where $$10\log_{10}\left(\frac{P_{Tx-RF}}{P_{Rx-RF}}\right)=40\text{ dB and }10\log_{10}\left(\frac{P_{Adj-RF}}{P_{Rx-RF}}\right)=3\text{ dB},$$

where $P_{Tx-RF}$ denotes the power of $S_{Tx-RF}$ where $P_{Rx-RF}$ denotes the power of $S_{Rx-RF}$, and where $P_{Adj-RF}$ denotes the power of $S_{Adj-RF}$.

In general terms, blind adaptation cannot rely on, for example detection, as disclosed above with reference to FIG. 3(a) to generate the error e(n). Instead a corresponding blind error, $e_{blind}(n)$, can be defined, which can be obtained without, e.g., detection as described above. This way, the algorithm can be made independent of the detection procedure. Thus, the blind versions of the methods disclosed herein can be implemented in, e.g., a radio unit separated from a modem unit which carries out detection. Such a blind error is used in minimizing a corresponding cost function as given in Equation (11):

$$J_{blind}(n)=E[e_{blind}(n)e_{blind}(n)^*]. \quad (11)$$

Particularly, according to an embodiment the interference distortion component signal $\hat{S}_{CM}$ is estimated by minimizing a blind error signal $e_{blind}(n)$ of the compensated reception signal $S_{Comp}$. According to an embodiment the interference distortion component signal $\hat{S}_{CM}$ is estimated using a least means squares estimate or a recursive least squares estimate based on the blind error signal $e_{blind}(n)$. It is appreciated that least means squares and recursive least squares are only examples estimate methods, and other alternative methods known in the art are equally possible for minimizing cost functions like Equation (11).

Mechanisms for blind estimation of the parameters defined in Equation (9) will follow next. The proposed mechanisms introduce a nuisance parameter, denoted γ, which is assumed either to be known a priori or is estimated. Hence, according to an embodiment the blind error signal $e_{blind}$ is based on a nuisance parameter γ that is either known a priori or estimated. A method for estimating γ resulting in good performance in comparison to the LMS algorithm (as used in Equation (10)), will also be disclosed below.

One approach is to modify Equation (10) with a Constant Modulus Algorithm (CMA) type of error signal. The LMS adaptation would take the form:

$$\beta_{k,l}(m+1)=\beta_{k,l}(m)-\mu e_{blind}(n)S_{Tot}(n)^*S_{Tx}(n-k)S_{Tx}(n-l)^*. \quad (12)$$

The blind error signal $e_{blind}(n)$ is here defined as:

$$e_{blind}(n)=S_{Comp}(n)(|S_{Comp}(n)|^N-\gamma). \quad (13)$$

The exponent N can be chosen as N≥1. Hence, according to an embodiment the blind error signal $e_{blind}$ at time index n is defined as in Equation (13). Two examples choices of N are 1 and 2. As disclosed above, the constant γ is assumed to be provided a priori or be estimated. One method to estimate γ is to evaluate the gradient $\nabla_{blind}(n, k, l)$ of Equation (12). Thus:

$$\nabla_{blind}(n,k,l)=e_{blind}(n)S_{Tot}(n)^*\text{i }S_{Tx}(n-k)S_{Tx}(n-l)^*$$
$$32\,S_{Comp}(n)(|S_{Comp}(n)|^N-\gamma)S_{Tot}(n)^*S_{Tx}(n-k)$$
$$S_{Tx}(n-l)^*. \quad (14)$$

For illustrative purposes, but without limitations and loss of generality, the gradient is hereinafter evaluated for a memoryless transmit signal, i.e. setting k=0 and l=0 in Equation (14). The memoryless gradient $\nabla_{blind}(n)$ thus becomes:

$$\nabla_{blind}(n)=S_{Ccomp}(n)(|S_{Comp}(n)|^N-\gamma)S_{Tot}(n)^*S_{Tx}(n)S_{Tx}(n)^*. \quad (15)$$

The mean of the memoryless gradient becomes:

$$E[\nabla_{blind}(n)]=E[S_{Comp}(n)(|S_{Comp}(n)|^N-\gamma)S_{Tot}(n)^*S_{Tx}(n)S_{Tx}(n)^*]= \quad (16)$$
$$E[S_{Comp}(n)|S_{Comp}(n)|^N S_{Tot}(n)^*S_{Tx}(n)S_{Tx}(n)^*]-$$
$$E[S_{Comp}(n)\gamma S_{Tot}(n)^*S_{Tx}(n)S_{Tx}(n)^*]=$$
$$E[S_{Comp}(n)|S_{Comp}(n)|^N S_{Tot}(n)^*S_{Tx}(n)S_{Tx}(n)^*]-$$
$$\gamma E[S_{Comp}(n)S_{Tot}(n)^*S_{Tx}(n)S_{Tx}(n)^*]$$

The compensated signal $S_{Comp}(n)$ can be expressed as:

$$S_{Comp}(n)=S_{Rx}(n)+2AS_{Rx}(n)S_{Tx}(n)^*+\hat{A}S_{Tot}(n)S_{Tx}$$
$$(n)S_{Tx}(n)S_{Tx}(n))(n)^*=S_{Rx}(n)+2AS_{Rx}(n)S_{Tx}(n)S_{Tx}$$
$$(n)^*+\hat{A}(S_{Rx}(n)+2AS_{Rx}(n)S_{Tx}(n)S_{Tx}(n)^*)S_{Tx}$$
$$(n)^*S_{Tx}(n)^*. \quad (17)$$

Using Equations (3), (16), (17), and assuming N=2 gives the following expression:

$$E[|S_{Rx}(n)|^4 S_{Tx}(n)S_{Tx}(n)^* + f_1(S_{Rx}(n), S_{Tx}(n); A, \hat{A})]- \quad (18)$$
$$\gamma E[|S_{Rx}(n)|^2 S_{Tx}(n)S_{Tx}(n)^* + f_2(S_{Rx}(n), S_{Tx}(n); A, \hat{A})]=$$
$$E[|S_{Rx}(n)|^4 S_{Tx}(n)S_{Tx}(n)^*]-\gamma E[|S_{Rx}(n)|^2 S_{Tx}(n)S_{Tx}(n)^*]+$$
$$E[f_1(S_{Rx}(n), S_{Tx}(n); A, \hat{A})]-\gamma E[f_2(S_{Rx}(n), S_{Tx}(n); A, \hat{A})]$$

The functions $f_1(S_{Rx}(n), S_{Tx}(n); A, \hat{A})$ and $f_2(S_{Rx}(n), S_{Tx}(n); A, \hat{A})$ depend on the unknown parameter A and the parameter to be estimated $\hat{A}$. However, there are other parts not depending on either the unknown or the estimated parameter and the mean values of these are constant for a stationary system. If not cancelled these two terms will affect the gradient. The value of γ can thus be derived from:

$$E[|S_{Rx}(n)|^4 S_{Tx}(n)^*] - \gamma E[|S_{Rx}(n)|^2 S_{Tx}(n) S_{Tx}(n)^*] = 0. \quad (19)$$

An equivalent expression for γ is thus:

$$\gamma = \frac{E[|S_{Rx}(n)|^4 S_{Tx}(n) S_{Tx}(n)^*]}{E[|S_{Rx}(n)|^2 S_{Tx}(n) S_{Tx}(n)^*]}. \quad (20)$$

Equation (20) can be written as:

$$\gamma = \frac{E[|S_{Rx}(n)|^4]}{E[|S_{Rx}(n)|^2]}. \quad (21)$$

Further, $$N = 1 \text{ gives } \gamma = \frac{E[|S_{Rx}(n)|^3]}{E[|S_{Rx}(n)|^2]}.$$

In scenarios where $s_{Rx}(n)$ is not explicitly available, $S_{Comp}(n)$ could be used as an approximation, thus yielding an expression for γ formulated as:

$$\gamma \approx \frac{E[|S_{Comp}(n)|^4]}{E[|S_{Comp}(n)|^2]}. \quad (22)$$

This is a reasonable approximation if $S_{Rx}(n) \approx S_{Comp}(n)$.

In some scenarios, γ is not assumed known. Instead γ is estimated from the received signal $S_{Tot}(n)$ (see FIG. 3(a)). The parameter γ does not carry any information directly used for estimating the cross modulation $\hat{S}_{CM}$, but is necessary for the choice of blind adaptation. The parameter γ could thus be viewed upon as a nuisance parameter. In general terms the term nuisance parameter could be defined according to Steven M Kay: "Fundamentals Of Statistical Signal Processing: Estimation Theory" Chapter 10.7, many estimation problems are characterized by a set of unknown parameters, of which we are really interested only in a subset. The remaining parameters, which serve only to complicate the problem, are referred to as nuisance parameters.

There are several mechanisms that could be used to estimate γ. Examples include, but are not limited to, estimating the components in Equation (22) or simplified versions of corresponding expressions. An alternative mechanism, relying on the cost function shown in Equation (11), is presented next. The signal observed by the estimator, after compensation, is a compensated version of $S_{Tot}(n)$ i.e., the above called $S_{Comp}(n)$. The LMS compensation does not necessary converge to an unbiased result when looking at the parameters. Instead the LMS adaptation tries to minimize a cost function (such as in Equations (8) and (11)), in this case the power of an error signal. Thus, the compensated signal does not necessarily result in that $S_{Comp}(n) = S_{Rs}(n)$. Instead of estimating a "true" γ, i.e., a γ based on the assumption that $S_{Comp}(n) \approx S_{Rs}(n)$, γ could be estimated by minimizing the same cost function related to the blind estimator of the unknown coefficients $\beta_{k,l}$. One reason is that it could be beneficial that the estimation of γ tries to minimize the same cost function as the estimation of the unknown coefficients.

The blind cost function can be evaluated according to:

$$J_{blind}(n) = E[S_{Comp}(n)(|S_{Comp}(n)|^N - \gamma)S_{Comp}(n)^* \\ (|S_{Comp}(n)|_N - \gamma)]. \quad (23)$$

The gradient of γ then becomes $$\frac{d}{d\gamma} J_{blind}(n) = \quad (24)$$

$$\frac{d}{d\gamma} E[S_{Comp}(n)(|S_{Comp}(n)|^N - \gamma)S_{Comp}(n)^*(|S_{Comp}(n)|^N - \gamma)] =$$

$$-2E[|S_{Comp}(n)|^2(|S_{Comp}(n)|^N - \gamma)]$$

Performing an iterative search (using LMS), γ can be expressed iteratively as $$\hat{\gamma}_{m+1} = \hat{\gamma}_m + \mu_\gamma |S_{Comp}(n)|^2(|S_{Comp}(n)|^N - \hat{\gamma}_m), \quad (25)$$

where $\mu_\gamma$ is the step length of the LMS adaptation. Hence, according to an embodiment the nuisance parameter γ is estimated from the reception signal $S_{Tot}$.

The proposed blind estimator disclosed above might not estimate the imaginary part of complex non-linear parameters. Hereinafter will be disclosed how the imaginary part could be estimated separately. This component will be denoted as Phase Modulation (PM) cross modulation. An error signal comprising the PM cross modulation is therefore defined. Using such an error signal, an LMS estimator for the PM cross modulation is derived by minimizing a cost function.

If the real part of the non-linearity $A_{Re}$ is comparatively small an estimation of the imaginary part $\hat{A}'_{Im}$ of the PM cross modulation can be approximated as:

$$\hat{A}'_{Im}(m+1) = \hat{A}'_{Im}(m) - \mu_{Im}(\Theta(n) - \Theta(n-k))(|\hat{C}_{AM} \\ (n)| - |\hat{C}_{AM}(n-k)|) \quad (26)$$

Equation (26) is an approximation of Equation (2) which can be used to iterative search for the unknown parameter $\hat{A}'_{Im}$. Equation (27) further provides a definition of $\hat{C}_{AM}$ representing a blind estimation of the compensation as defined in Equation (9) by using Equation (12) and a definition of Θ representing the measured phase of the signal $S_{Comp}$:

$$\hat{A}'_{Im}(m+1) = \hat{A}'_{Im}(m) - \quad (27)$$

$$\mu'_{Im}(\Theta(n) - \Theta(n-k)) \left( \frac{|\hat{C}_{AM}(n)|(1 + \hat{C}_{AM}(n))}{1 + 2\hat{C}_{AM}(n) + |\hat{C}_{AM}(n)|^2(1 + \hat{A}'_{Im}(m)^2)} - \frac{|\hat{C}_{AM}(n-k)|(1 + \hat{C}_{AM}(n-k))}{1 + 2\hat{C}_{AM}(n-k) + |\hat{C}_{AM}(n-k)|^2(1 + \hat{A}'_{Im}(m)^2)} \right)$$

where $\mu_{Im}$ is the step length of the LMS adaptation for the imaginary part.

Figure 11:
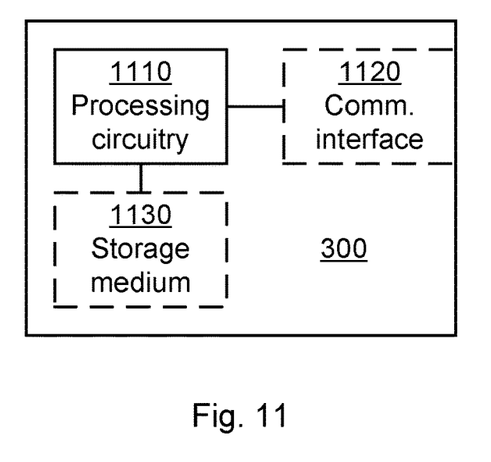
FIG. 11 is a schematic diagram showing functional units of a control device according to an embodiment.

FIG. 11 schematically illustrates, in terms of a number of functional units, the components of a control device 300 according to an embodiment. Processing circuitry 1110 is provided using any combination of one or more of a suitable central processing unit (CPU), multiprocessor, microcontroller, digital signal processor (DSP), etc., capable of executing software instructions stored in a computer program product 1310 (as in FIG. 13), e.g. in the form of a storage medium 1130. The processing circuitry 1110 may further be provided as at least one application specific integrated circuit (ASIC), or field programmable gate array (FPGA).

Particularly, the processing circuitry 1110 is configured to cause the control device 300 to perform a set of operations, or steps, S102-S110, as disclosed above. For example, the storage medium 1130 may store the set of operations, and the processing circuitry 1110 may be configured to retrieve the set of operations from the storage medium 1130 to cause the control device 300 to perform the set of operations. The set of operations may be provided as a set of executable instructions.

Thus the processing circuitry 1110 is thereby arranged to execute methods as herein disclosed. The storage medium 1130 may also comprise persistent storage, which, for example, can be any single one or combination of magnetic memory, optical memory, solid state memory or even remotely mounted memory. The control device 300 may further comprise a communications interface 1120 at least configured to obtain $S_{Tx}$, $\Theta$, $S_{Tot}$, and to provide $S_{Comp}$. As such the communications interface 1120 may comprise one or more transmitters and receivers, comprising analogue and digital components. The processing circuitry 1110 controls the general operation of the control device 300 e.g. by sending data and control signals to the communications interface 1120 and the storage medium 1130, by receiving s data and reports from the communications interface 1120, and by retrieving data and instructions from the storage medium 1130. Other components, as well as the related functionality, of the control device 300 are omitted in order not to obscure the concepts presented herein.

Figure 12:
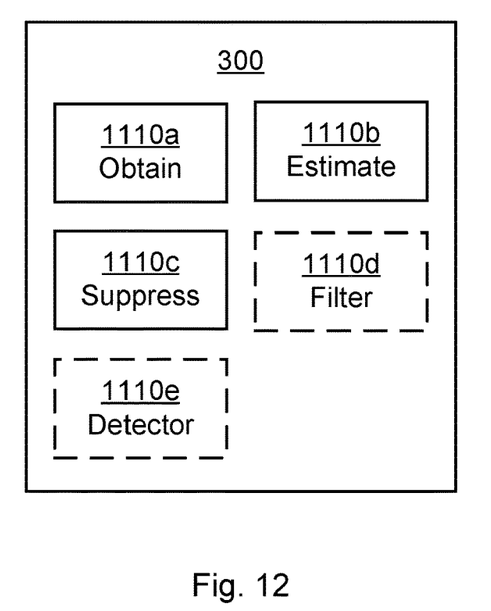
FIG. 12 is a schematic diagram showing functional modules of a control device according to an embodiment.

FIG. 12 schematically illustrates, in terms of a number of functional modules, the components of a control device 300 according to an embodiment. The control device 300 of FIG. 12 comprises a number of functional modules; an obtain module 1110a configured to perform step S102, an estimate module 1110b configured to perform step S104, and a suppress module 1110c configured to perform step S106. The control device 300 of FIG. 12 may further comprises a number of optional functional modules, such as any of a filter module configured to perform step S108, and a detector module 1110e configured to perform step S110.

In general terms, each functional module 1110a-1110e may in one embodiment be implemented only in hardware or and in another embodiment with the help of software, i.e., the latter embodiment having computer program instructions stored on the storage medium 1130 which when run on the processing circuitry makes the control device 300 perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 1110a-1110e may be implemented by the processing circuitry 1110, possibly in cooperation with functional units 1120 and/or 1130. The processing circuitry 1110 may thus be configured to from the storage medium 1130 fetch instructions as provided by a functional module 1110a-1110e and to execute these instructions, thereby performing any steps as disclosed herein.

The control device 300 may be provided as a standalone device or as a part of at least one further device. For example, the control device 300 may be provided in the radio transceiver device 100. Hence, according to an embodiment there is provided a radio transceiver device 100 as herein disclosed comprising a control device 300 as herein disclosed.

Alternatively, functionality of the control device 300 may be distributed between at least two devices, or nodes. Thus, a first portion of the instructions performed by the control device 300 may be executed in a first device, and a second portion of the of the instructions performed by the control device 300 may be executed in a second device; the herein disclosed embodiments are not limited to any particular number of devices on which the instructions performed by the control device 300 may be executed. Hence, the methods according to the herein disclosed embodiments are suitable to be performed by a control device 300 residing in a cloud computational environment. Therefore, although a single processing circuitry 1110 is illustrated in FIG. 11 the processing circuitry 1110 may be distributed among a plurality of devices, or nodes. The same applies to the functional modules 1110a-1110e of FIG. 12 and the computer program 1320 of FIG. 13 (see below).

Figure 13:
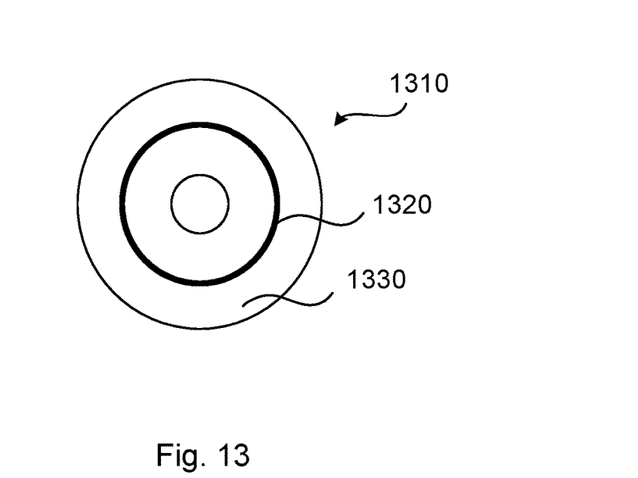
FIG. 13 shows one example of a computer program product comprising computer readable storage medium according to an embodiment.

FIG. 13 shows one example of a computer program product 1310 comprising computer readable storage medium 1330. On this computer readable storage medium 1330, a computer program 1320 can be stored, which computer program 1320 can cause the processing circuitry 1110 and thereto operatively coupled entities and devices, such as the communications interface 1120 and the storage medium 1130, to execute methods according to embodiments described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by a control device for suppressing interference in a received reception signal $S_{Tot}$ in a radio transceiver device configured to receive the reception signal $S_{Tot}$ as a radio reception signal $S_{Tot\text{-}RF}$ and to generate a radio transmission signal $S_{Tx\text{-}RF}$, wherein the radio transmission signal $S_{Tx\text{-}RF}$ and the radio reception signal $S_{Tot\text{-}RF}$ occupy at least partly non-overlapping frequency bands, the method comprising:

obtaining a transmission reference signal $S_{Tx}$, the radio transmission signal $S_{Tx\text{-}RF}$ being an upconverted version of the transmission reference signal $S_{Tx}$;

estimating an interference distortion component signal $\hat{S}_{CM}$ based on the transmission reference signal $S_{Tx}$ and on a model of nonlinearity in a radio circuit of the radio transceiver device;

suppressing the interference in the reception signal $S_{Tot}$ by combining the reception signal $S_{Tot}$ with the interference distortion component signal $\hat{S}_{CM}$; and wherein combining the reception signal $S_{Tot}$ with the interference distortion component signal $\hat{S}_{CM}$ results in a compensated reception signal $S_{Comp}$ and estimating the interference distortion component signal $\hat{S}_{CM}$ comprises estimating the interference distortion component signal $\hat{S}_{CM}$ by minimizing a blind error signal $e_{blind}$ of the compensated reception signal $S_{Comp}$.

2. The method according to claim 1, wherein the interference distortion component signal $\hat{S}_{CM}$ is an estimation of cross modulation in a receiver branch of the radio transceiver device.

3. The method according to claim 1, wherein the reception signal $S_{Tot}$ comprises a desired radio reception signal $S_{Rx-RF}$ and an internal leakage contribution, as modelled by the model of nonlinearity, of the radio transmission signal $S_{Tx-RF}$.

4. The method according to claim 3, wherein the radio transmission signal $S_{Tx-RF}$ is more than one order of magnitude larger in power than the desired radio reception signal $S_{RX-RF}$.

5. The method according to claim 3, wherein the reception signal $S_{Tot}$ further comprises an external leakage contribution $S_{Adj-RF}$ of another radio reception signal, wherein the desired radio reception signal $S_{Rx-RF}$ and said another radio reception signal are located on neighbouring carrier frequencies.

6. The method according to claim 1, wherein the compensated reception signal $S_{Comp}$ is determined so as to compensate the reception signal $_{Tot}$ for an internal leakage contribution $h(S_{Tx}{}^-{}_{RF})$.

7. The method according to claim 1, wherein the interference distortion component signal $\hat{S}_{CM}$ represents at least one non-linear component f in the radio circuit.

8. The method according to claim 1, wherein the blind error signal $e_{blind}$ is based on a nuisance parameter γ that is either known a priori or estimated.

9. The method according to claim 8, wherein the nuisance parameter γ is estimated from the reception signal $S_{Tot}$.

10. The method according to claim 8, wherein the blind error signal $e_{blind}$ at time index n is defined as $$e_{blind}(n) = S_{Comp}(n)(|S_{Comp}(n)|^N - \gamma)$$

where N≥1 is an integer.

11. The method according to claim 1, wherein the interference distortion component signal $\hat{S}_{CM}$ is estimated using a least means squares estimate or a recursive least squares estimate based on the blind error signal $e_{blind}$.

12. The method according to claim 1, wherein the model is based on band-stop filtering of the radio transmission signal $S_{Tx-RF}$.

13. A control device for suppressing interference in a received reception signal $S_{Tot}$ in a radio transceiver device configured to receive the reception signal $S_{Tot}$ as a radio reception signal $S_{Tot-RF}$ and to generate a radio transmission signal $S_{Tx-RF}$, wherein the radio transmission signal $S_{Tx-RF}$ and the radio reception signal $S_{Tot-RF}$ occupy at least partly non-overlapping frequency bands, the control device comprising processing circuitry, the processing circuitry being configured to cause the control device to:
obtain a transmission reference signal $S_{Tx}$, the radio transmission signal $S_{Tx-RF}$ being an upconverted version of the transmission reference signal $S_{Tx}$;
estimate an interference distortion component signal $\hat{S}_{CM}$ based on the transmission reference signal $S_{Tx}$ and on a model of nonlinearity in a radio circuit of the radio transceiver device;
suppress the interference in the reception signal $S_{Tot}$ by combining the reception signal $S_{Tot}$ with the interference distortion component signal $\hat{S}_{CM}$; and
wherein combining the reception signal $S_{Tot}$ with the interference distortion component signal $\hat{S}_{CM}$ results in a compensated reception signal $S_{Comp}$ and estimating the interference distortion component signal $\hat{S}_{CM}$ comprises estimating the interference distortion component signal $\hat{S}_{CM}$ by minimizing a blind error signal $e_{blind}$ of the compensated reception signal $S_{Comp}$.

14. A control device for suppressing interference in a received reception signal $S_{Tot}$ in a radio transceiver device configured to receive the reception signal $S_{Tot}$ as a radio reception signal $S_{Tot-RF}$ and to generate a radio transmission signal $S_{Tx-RF}$, wherein the radio transmission signal $S_{Tx-RF}$ and the radio reception signal $S_{Tot-RF}$ occupy at least partly non-overlapping frequency bands, the control device comprising:
processing circuitry; and
a computer program product storing instructions that, when executed by the processing circuitry, causes the control device to:
obtain a transmission reference signal $S_{Tx}$, the radio transmission signal $S_{Tx-RF}$ being an upconverted version of the transmission reference signal $S_{Tx}$;
estimate an interference distortion component signal $\hat{S}_{CM}$ based on the transmission reference signal $S_{Tx}$ and on a model of nonlinearity in a radio circuit of the radio transceiver device;
suppress the interference in the reception signal $S_{Tot}$ by combining the reception signal $S_{Tot}$ with the interference distortion component signal $\hat{S}_{CM}$; and
wherein combining the reception signal $S_{Tot}$ with the interference distortion component signal $\hat{S}_{CM}$ results in a compensated reception signal $S_{Comp}$ and estimating the interference distortion component signal $\hat{S}_{CM}$ comprises estimating the interference distortion component signal $\hat{S}_{CM}$ by minimizing a blind error signal $e_{blind}$ of the compensated reception signal $S_{Comp}$.

15. A control device for suppressing interference in a received reception signal $S_{Tot}$ in a radio transceiver device configured to receive the reception signal $S_{Tot}$ as a radio reception signal $S_{Tot-RF}$ and to generate a radio transmission signal $S_{Tx-RF}$, wherein the radio transmission signal $S_{Tx-RF}$ and the radio reception signal $S_{Tot-RF}$ occupy at least partly non-overlapping frequency bands, the control device comprising:
an obtain module configured to obtain a transmission reference signal $S_{Tx}$, the radio transmission signal $S_{Tx-RF}$ being an upconverted version of the transmission reference signal $S_{Tx}$;
an estimate module configured to estimate an interference distortion component signal $\hat{S}_{CM}$ based on the transmission reference signal $S_{Tx}$ and on a model of nonlinearity in a radio circuit of the radio transceiver device;
a suppress module configured to suppress the interference in the reception signal $S_{Tot}$ by combining the reception signal $S_{Tot}$ with the interference distortion component signal $\hat{S}_{CM}$; and
wherein combining the reception signal $S_{Tot}$ with the interference distortion component signal $\hat{S}_{CM}$ results in a compensated reception signal $S_{Comp}$ and estimating the interference distortion component signal $\hat{S}_{CM}$ comprises estimating the interference distortion component signal $\hat{S}_{CM}$ by minimizing a blind error signal $e_{blind}$ of the compensated reception signal $S_{Comp}$.

16. For suppressing interference in a received reception signal $S_{Tot}$ in a radio transceiver device configured to receive the reception signal $S_{Tot}$ as a radio reception signal $S_{Tot-RF}$ and to generate a radio transmission signal $S_{Tx-RF}$, wherein the radio transmission signal $S_{Tx-RF}$ and the radio reception signal $S_{Tot-RF}$ occupy at least partly non-overlapping frequency bands, a non-transitory computer-readable storage medium comprising a computer program product including instructions to cause at least one processor to:
  obtain a transmission reference signal $S_{Tx}$, the radio transmission signal $S_{Tx-RF}$ being an upconverted version of the transmission reference signal $S_{Tx}$;
  estimate an interference distortion component signal $\hat{S}_{CM}$ based on the transmission reference signal $S_{Tx}$ and on a model of nonlinearity in a radio circuit of the radio transceiver device;
  suppress the interference in the reception signal $S_{Tot}$ by combining the reception signal $S_{Tot}$ with the interference distortion component signal $\hat{S}_{CM}$; and
  wherein combining the reception signal $S_{Tot}$ with the interference distortion component signal $\hat{S}_{CM}$ results in a compensated reception signal $S_{Comp}$ and estimating the interference distortion component signal $\hat{S}_{CM}$ comprises estimating the interference distortion component signal $\hat{S}_{CM}$ by minimizing a blind error signal $e_{blind}$ of the compensated reception signal $S_{Comp}$.

* * * * *